(12) United States Patent
Kidd et al.

(10) Patent No.: US 10,173,899 B1
(45) Date of Patent: Jan. 8, 2019

(54) AQUEOUS LEACHING SOLUTIONS AND METHODS OF LEACHING AT LEAST ONE INTERSTITIAL CONSTITUENT FROM A POLYCRYSTALLINE DIAMOND BODY USING THE SAME

(71) Applicant: US Synthetic Corporation, Orem, UT (US)

(72) Inventors: Julie Ann Kidd, North Ogden, UT (US); Heather Marie Schaefer, North Ogden, UT (US); Chengkun Xu, Orem, UT (US); Jason K. Wiggins, Draper, UT (US); Matthew Brown, Provo, UT (US); Cody Frisby, Payson, UT (US)

(73) Assignee: US SYNTHETIC CORPORATION, Orem, UT (US)

( * ) Notice: Subject to any disclaimer, the term of this patent is extended or adjusted under 35 U.S.C. 154(b) by 0 days.

(21) Appl. No.: 15/065,246

(22) Filed: Mar. 9, 2016

Related U.S. Application Data

(60) Provisional application No. 62/135,438, filed on Mar. 19, 2015.

(51) Int. Cl.
*B01J 3/00* (2006.01)
*C22B 23/00* (2006.01)
(Continued)

(52) U.S. Cl.
CPC .............. *C01B 31/065* (2013.01); *B01J 3/062* (2013.01); *B24D 18/00* (2013.01);
(Continued)

(58) Field of Classification Search
CPC . C22B 23/00; C22B 23/0407; C22B 23/0415; C25F 3/00; B01J 3/00; E21B 10/56
See application file for complete search history.

(56) References Cited

U.S. PATENT DOCUMENTS 7,845,438 B1  12/2010  Vail et al.
7,866,418 B2  1/2011   Bertagnolli et al.
(Continued)

FOREIGN PATENT DOCUMENTS

GB      2465260    *  5/2010  ........... C04B 35/528

OTHER PUBLICATIONS

Wang et al., "Modeling viscosity of concentrated and mixed-solvent electrolyte systems", Fluid Phase Equilibria 226 (2004) pp. 71-82.
(Continued)

*Primary Examiner* — Pegah Parvini
(74) *Attorney, Agent, or Firm* — FisherBroyles, LLP

(57) ABSTRACT

In an embodiment, a method of fabricating a leached polycrystalline diamond ("PCD") body is disclosed. The PCD body includes bonded diamond grains defining interstitial regions at least a portion of which include at least one interstitial constituent disposed therein. The method includes leaching the PCD body with a leaching agent to remove at least a portion of the at least one interstitial constituent therefrom. The leaching agent includes a mixture having hydrofluoric acid in a first concentration of about 10 weight % to about 50 weight %, nitric acid in a second concentration of about 5 weight % to about 25 weight %, and water in a third concentration of about 25 weight % to about 85 weight %. Further embodiments relate to different leaching methods and different leaching agent compositions.

24 Claims, 8 Drawing Sheets

(51) Int. Cl.
*E21B 10/56* (2006.01)
*C01B 31/06* (2006.01)
*B24D 18/00* (2006.01)
*B01J 3/06* (2006.01)

(52) U.S. Cl.
CPC ..... *B24D 18/0009* (2013.01); *B24D 18/0027* (2013.01); *E21B 10/56* (2013.01); *B01J 2203/062* (2013.01)

(56) References Cited

U.S. PATENT DOCUMENTS

| | | |
|---|---|---|
| 8,596,387 B1 | 12/2013 | Sani et al. |
| 2004/0060243 A1* | 4/2004 | Fries ................ B24D 3/08 51/293 |
| 2006/0266558 A1* | 11/2006 | Middlemiss ............ B22F 7/062 175/426 |
| 2007/0169419 A1* | 7/2007 | Davis .................... B01J 19/008 51/293 |
| 2008/0142276 A1* | 6/2008 | Griffo ................ E21B 10/5735 175/432 |
| 2010/0294571 A1* | 11/2010 | Belnap .................... E21B 10/55 175/434 |
| 2012/0152064 A1* | 6/2012 | Ladi ........................ C22B 3/44 75/743 |

OTHER PUBLICATIONS

U.S. Appl. No. 14/084,058, filed Nov. 19, 2013, Gleason et al.
U.S. Appl. No. 62/135,438, filed Mar. 19, 2015, Kidd et al.

* cited by examiner

AQUEOUS LEACHING SOLUTIONS AND METHODS OF LEACHING AT LEAST ONE INTERSTITIAL CONSTITUENT FROM A POLYCRYSTALLINE DIAMOND BODY USING THE SAME

CROSS-REFERENCE TO RELATED APPLICATIONS

This application claims priority to U.S. Provisional Application No. 62/135,438 filed on 19 Mar. 2015, the disclosure of which is incorporated herein, in its entirety, by this reference.

BACKGROUND

Wear-resistant, superabrasive compacts are utilized in a variety of mechanical applications. For example, polycrystalline diamond compacts ("PDCs") are used in drilling tools (e.g., cutting elements, gage trimmers, etc.), machining equipment, bearing apparatuses, wire-drawing machinery, and in other mechanical apparatuses.

PDCs have found particular utility as superabrasive cutting elements in rotary drill bits, such as roller cone drill bits and fixed cutter drill bits. A PDC cutting element typically includes a superabrasive diamond layer (also known as a diamond table). The diamond table is formed and bonded to a substrate using an ultra-high pressure, ultra-high temperature ("HPHT") process. The PDC cutting element may also be brazed directly into a preformed pocket, socket, or other receptacle formed in the bit body. The substrate may be often brazed or otherwise joined to an attachment member, such as a cylindrical backing. A rotary drill bit typically includes a number of PDC cutting elements affixed to the bit body. It is also known that a stud carrying the PDC may be used as a PDC cutting element when mounted to a bit body of a rotary drill bit by press-fitting, brazing, or otherwise securing the stud into a receptacle formed in the bit body.

Conventional PDCs are normally fabricated by placing a cemented-carbide substrate into a container or cartridge with a volume of diamond particles positioned adjacent to a surface of the cemented-carbide substrate. A number of such cartridges may be loaded into an HPHT press. The substrates and volume of diamond particles are then processed under HPHT conditions in the presence of a catalyst that causes the diamond particles to bond to one another to form a matrix of bonded diamond grains defining a polycrystalline diamond ("PCD") table. The catalyst is often a metal-solvent catalyst, such as cobalt, nickel, iron, or alloys thereof that is used for promoting intergrowth of the diamond particles.

In one conventional approach for forming a PDC, a constituent of the cemented-carbide substrate, such as cobalt from a cobalt-cemented tungsten carbide substrate, liquefies and sweeps from a region adjacent to the volume of diamond particles into interstitial regions between the diamond particles during the HPHT process. The cobalt acts as a metal-solvent catalyst to promote intergrowth between the diamond particles, which results in formation of bonded diamond grains. A metal-solvent catalyst may be mixed with the diamond particles prior to subjecting the diamond particles and substrate to the HPHT process.

The presence of the metal-solvent catalyst and/or other materials in the PCD table may reduce the thermal stability of the PCD table at elevated temperatures. For example, the difference in thermal expansion coefficient between the diamond grains and the metal-solvent catalyst is believed to lead to chipping or cracking in the PCD table during drilling or cutting operations. The chipping or cracking in the PCD table may degrade the mechanical properties of the cutting element or lead to failure of the cutting element. Additionally, at high temperatures, diamond grains may undergo a chemical breakdown or back-conversion with the metal-solvent catalyst. Further, portions of diamond grains may transform to carbon monoxide, carbon dioxide, graphite, or combinations thereof, thereby degrading the mechanical properties of the PCD material.

Accordingly, the metal-solvent catalyst may be removed from the PCD table in situations when the PCD table may be exposed to high temperatures. Chemical leaching is often used to dissolve and remove various materials from the PCD table. For example, chemical leaching may be used to remove metal-solvent catalysts, such as cobalt, from one or more regions of a PCD table that may experience elevated temperatures during drilling, such as regions adjacent to the working surfaces of the PCD table.

SUMMARY

Embodiments of the invention relate to aqueous leaching agents and methods of at least partially removing at least one interstitial constituent (e.g., a catalyst or a metallic infiltrant) from a PCD body using such aqueous leaching agents. The leaching agent may include a mixture having hydrofluoric acid, nitric acid, and water, with the mixture exhibiting a relatively low viscosity. Removing the at least one interstitial constituent using the leaching agent including the mixture unexpectedly removes the at least one interstitial constituent from the PCD table more rapidly and more effectively than conventional leaching agents.

In an embodiment, a method of fabricating an at least partially leached PCD table is disclosed. The method includes providing a PCD table. The PCD table includes a plurality of bonded diamond grains defining a plurality of interstitial regions at least a portion of which include at least one interstitial constituent disposed therein. The method further includes leaching the PCD table with a leaching agent to remove at least a portion of the at least one interstitial constituent from the PCD table. The leaching agent includes a mixture having hydrofluoric acid in a first concentration of about 10 weight % to about 50 weight %, nitric acid in a second concentration of about 5 weight % to about 25 weight %, and water in a third concentration of about 25 weight % to about 85 weight %. In an embodiment, the at least partially leached PCD table is further bonded to a substrate in a second HPHT process.

In an embodiment, a method of fabricating a PDC is disclosed. The method includes providing a PCD table including an interfacial surface bonded to a substrate and an opposing upper surface. The PCD table includes a plurality of bonded diamond grains defining a plurality of interstitial regions at least a portion of which include at least one interstitial constituent disposed therein. The method further includes leaching the PCD table with a leaching agent to remove at least a portion of the at least one interstitial constituent from the PCD table. The leaching agent includes a mixture having hydrofluoric acid in a first concentration of about 10 weight % to about 50 weight %, nitric acid in a second concentration of about 5 weight % to about 25 weight %, and water in a third concentration of about 25 weight % to about 85 weight %.

In an embodiment, a method of fabricating a PDC includes providing a PCD table including an interfacial surface bonded to a substrate and an opposing upper surface. The PCD table includes a plurality of bonded diamond grains defining a plurality of interstitial regions at least a portion of which include at least one interstitial constituent disposed therein. The method further includes leaching the PCD table with a leaching agent to remove at least a portion of the at least one interstitial constituent from the PCD table. The leaching agent includes a mixture having hydrofluoric acid and nitric acid. The leaching agent exhibits a viscosity of less than about 0.55 centipoise.

In another embodiment, an aqueous leaching solution for use in leaching at least one interstitial constituent from PCD includes hydrofluoric acid in a first concentration of about 10 weight % to about 50 weight %, nitric acid in a second concentration of about 5 weight % to about 25 weight %, and water in a third concentration of about 25 weight % to about 85 weight %.

Features of any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the invention, wherein identical reference numerals refer to identical or similar elements or features in different views or embodiments shown in the drawings.

DETAILED DESCRIPTION

Embodiments of the invention relate to methods of fabricating PCD bodies and PDCs in which a leaching agent (i.e., aqueous leaching solution) including a relatively low viscosity mixture having hydrofluoric acid, nitric acid, and water is used to remove at least one interstitial constituent (e.g., a catalyst and/or a metallic infiltrant) from at least a portion of a PCD body to form an at least partially porous PCD body, resultant PCD bodies and PDCs, and applications for such PCD bodies and PDCs. The leaching agent including the disclosed low viscosity mixtures may provide more rapid and effective removal of the at least one interstitial constituent from a PCD body than conventional acid leaching.

The inventors currently believe that the at least one interstitial constituent is more rapidly and effectively removed from a PCD body because the leaching agents disclosed herein exhibit a relatively low viscosity that may improve diffusion of the leaching agent into and through the interstitial regions of the PCD body and diffusion of the leaching agent, including the at least one interstitial constituent dissolved therein, from the interstitial regions of the PCD body. The inventors currently believe that the disclosed leaching agents exhibit an unexpectedly rapid and effective removal of the at least one interstitial constituent from the PCD body because the leaching agents exhibit a relatively low viscosity caused by a relatively high concentration of hydrofluoric acid compared to the concentration of nitric acid, while still including sufficient nitric acid to remove at least one interstitial constituent from the PCD body without significant reaction with a masking material that masks the PCD body during leaching.

Figure 1A:
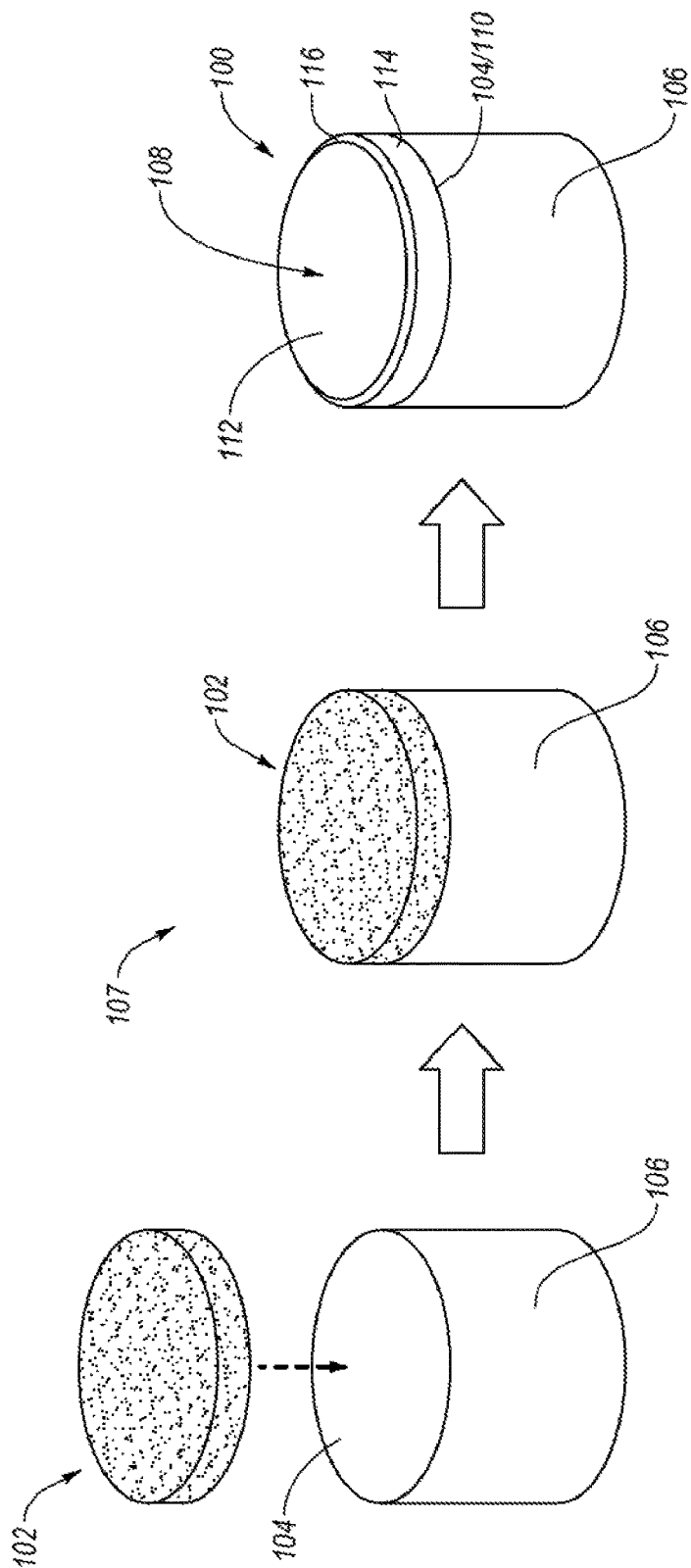
FIG. 1A is a schematic illustration of a method of fabricating a PDC according to an embodiment.
Figure 1B:
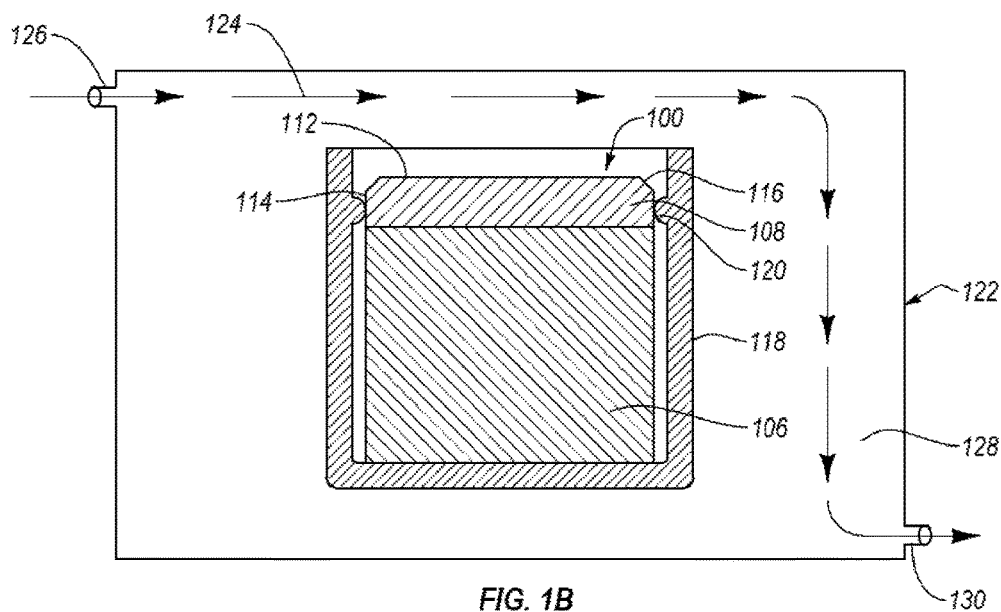
FIGS. 1B and 1C are cross-sectional views illustrating different stages in a method of leaching a PCD table of the PDC formed in FIG. 1A using a leaching agent that includes a mixture having hydrofluoric acid, nitric acid, and water according to an embodiment.
Figure 1C:
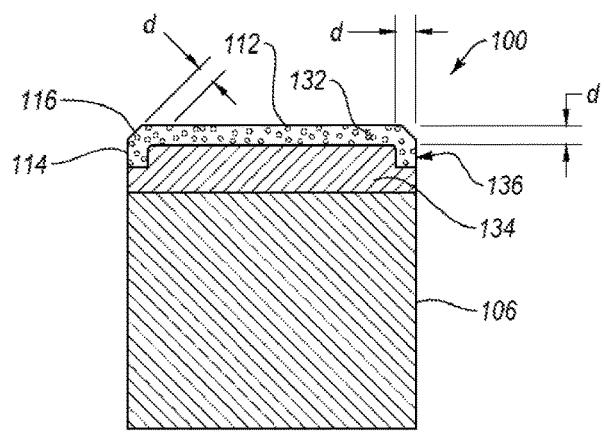

FIGS. 1A-1C illustrate different stages in a method of fabricating a PDC 100 according to an embodiment. The method includes placing a mass of diamond particles 102 adjacent to a substrate 106 to form an assembly 107 and subjecting the assembly 107 to an HPHT process. During the HPHT process, a catalyst may infiltrate the mass of diamond particles 102 to facilitate intergrowth between the mass of diamond particles 102 and form a PCD table 108 including directly bonded-together diamond grains defining a plurality of interstitial regions at least partially occupied by at least one interstitial constituent (e.g., catalyst and/or metallic infiltrant). The at least one interstitial constituent may be removed from the PCD table 108 by exposing the PCD table 108 to a leaching agent that includes a mixture having hydrofluoric acid, nitric acid, and water exhibiting a relatively low viscosity. The leaching agent including the mixture may provide more rapid and effective removal of the at least one interstitial constituent from the PCD table 108 than conventional leaching.

FIG. 1A is a schematic illustration of an embodiment of a method for fabricating a PDC 100. Referring to FIG. 1A, the mass of diamond particles 102 may be positioned adjacent to an interfacial surface 104 of a substrate 106 to form an assembly 107. The mass of diamond particles 102 may exhibit, for example, an average particle size between about 0.5 µm to about 150 µm (e.g., about 50 µm or less, about 30 µm or less, about 20 µm or less, about 10 µm to about 18 µm, or about 15 µm to about 18 µm). The diamond particle size distribution of the mass of diamond particles 102 may exhibit a single mode, or may exhibit a bimodal or greater grain size distribution. In an embodiment, the mass of diamond particles 102 may include a relatively larger size and at least one relatively smaller size. As used herein, the phrases "relatively larger" and "relatively smaller" refer to particle sizes determined by any suitable method, which differ by at least a factor of two (e.g., 40 µm and 20 µm). In various embodiments, the mass of diamond particles 102 may include a portion exhibiting a relatively larger size (e.g., 100 µm, 90 µm, 80 µm, 70 µm, 60 µm, 50 µm, 40 µm, 30 µm, 20 µm, 15 µm, 12 µm, 10 µm, 8 µm) and another portion exhibiting at least one relatively smaller size (e.g., 30 µm, 20 µm, 10 µm, 15 µm, 12 µm, 10 µm, 8 µm, 4 µm, 2 µm, 1 µm, 0.5 µm, less than 0.5 µm, 0.1 µm, less than 0.1 µm). In an embodiment, the mass of diamond particles 102 may include a portion exhibiting a relatively larger size of about 15 µm to about 40 µm and another portion exhibiting a relatively smaller size of about 2 µm and about 12 µm. Of course, the mass of diamond particles 102 may also include three or more different sizes (e.g., one relatively larger size and two or more relatively smaller sizes), without limitation.

In an embodiment, the substrate 106 may comprise a cobalt-cemented tungsten carbide substrate from which cobalt and/or a cobalt alloy infiltrates into the mass of diamond particles 102. In another embodiment, the substrate 106 may be formed from another suitable material including, without limitation, cemented carbides including titanium carbide, niobium carbide, tantalum carbide, vanadium carbide, and combinations of any of the preceding carbides cemented with iron, nickel, cobalt, or alloys thereof. However, in other embodiments, the substrate 106 may be replaced with a metal-solvent catalyst (e.g., cobalt, iron, nickel, or alloys thereof) or carbonate catalyst (e.g., one or more alkali earth carbonates or alkaline earth carbonates) disc and/or catalyst particles may be mixed with the mass of diamond particles 102.

In order to effectively HPHT sinter the mass of diamond particles 102, the assembly 107 may be placed in a pressure transmitting medium, such as a refractory metal can, graphite structure, pyrophyllite or other pressure transmitting structure, combinations thereof, or another suitable container or supporting element. The pressure transmitting medium, including the assembly 107, may be subjected to an HPHT process at a temperature of at least about 1000° C. (e.g., about 1100° C. to about 2200° C., or about 1200° C. to about 1450° C.) and a pressure in the pressure transmitting medium of at least about 5 GPa (e.g., at least about 7.5 GPa, at least about 9.0 GPa, at least about 10.0 GPa, at least about 11.0 GPa, at least about 12.0 GPa, at least about 14.0, or about 7.5 GPa to about 9.0 GPa) for a time sufficient to sinter the diamond particles 102 and form a PCD table 108 bonded to the substrate 106 thereby forming the PDC 100.

During the HPHT process, the presence of the catalyst facilitates intergrowth between the mass of diamond particles 102 and forms the PCD table 108 including directly bonded-together diamond grains (e.g., exhibiting $sp^3$ bonding) defining a plurality of interstitial regions. In the illustrated embodiment, the PDC 100 may be formed by sintering the mass of diamond particles 102 on the substrate 106, which may be a cobalt-cemented tungsten carbide substrate from which cobalt and/or a cobalt alloy liquefies during the HPHT process and infiltrates into the mass of diamond particles 102 to thereby catalyze formation of the PCD table 108. In such an embodiment, some tungsten and tungsten carbide (i.e., metallic infiltrants) from the substrate 106 may dissolve in or otherwise transfer with the catalyst. Additionally, the catalyst and the metallic infiltrants may react with the mass of diamond particles 102 to form carbides. As such, the interstitial regions of the PCD table 108 may be at least partially occupied by at least one interstitial constituent (e.g., at least one of a metal-solvent catalyst, a metallic infiltrant, or one or more formed carbides).

The formed PCD table 108 may include an interfacial surface 110 bonded to the interfacial surface 104 of the substrate 106 and an opposing upper surface 112. The PCD table 108 may include at least one lateral surface 114 extending between the interfacial surface 110 and the upper surface 112. In an embodiment, the sintered diamond grains of the PCD table 108 may exhibit an average grain size of about 20 µm of less.

Examples of suitable HPHT sintering process conditions that may be used to practice any of the embodiments disclosed herein and form PDCs and other PCD bodies are disclosed in U.S. Pat. No. 7,866,418 which is incorporated herein, in its entirety, by this reference.

After the HPHT process, the PDC 100 may be subsequently shaped to provide a peripherally-extending chamfer 116. Further, as shown in FIG. 1B, the PCD table 108 may be at least partially leached to remove at least a portion of the at least one interstitial constituent therefrom. In an embodiment, the PDC 100 may be at least partially immersed in and/or exposed to any of the leaching agents disclosed herein to at least partially leach the at least one interstitial constituent from the PCD table 108. Removing at least a portion of the at least one interstitial constituent from the PCD table 108 may improve the wear resistance of the PCD table 108, the heat resistance of the PCD table 108, the thermal stability of the PCD table 108, or combinations thereof particularly in situations where the PCD table 108 may be exposed to elevated temperatures.

In an embodiment, the PCD table 108 may be leached to remove at least a portion of the at least one interstitial constituent therefrom using any of the leaching agents disclosed herein that includes a mixture of hydrofluoric acid, nitric acid, and water. The at least one interstitial constituent may mostly include a catalyst, such as cobalt, iron, nickel, alloys thereof, combinations thereof, or other metal-solvent catalysts, with lesser amounts of a metallic material (e.g., one or more of a metallic infiltrant, tungsten, or tungsten carbide) and a variety of other carbides (e.g., cobalt carbides). In such an embodiment, the nitric acid may promote dissolution of the cobalt, while the hydrofluoric acid may promote dissolution of the remaining interstitial materials. The inventors found that the at least one interstitial constituent is more rapidly and effectively removed from the PCD table 108 using a mixture having a relatively high concentration of hydrofluoric acid compared to nitric acid. The result was unexpected because the inventors expected that the at least one interstitial constituent would be more rapidly and effectively removed from the PCD table 108 if the leaching agent included a relatively high concentration of nitric acid, which is a stronger acid than hydrofluoric acid. The inventors currently believe that the at least one interstitial constituent is more rapidly and effectively removed from the PCD table 108 because the leaching agent exhibits a relatively low viscosity, which may improve diffusion of the leaching agent into and through the interstitial regions of the PCD table 108 and diffusion of the leaching agent, including the at least one interstitial constituent dissolved therein, from the interstitial regions of the PCD table 108. The inventors currently believe that the mixtures for the leaching agents exhibit an unexpectedly rapid and effective removal of the at least one interstitial constituent from the PCD table 108 because the mixtures exhibit a low viscosity caused by the relatively high concentration of hydrofluoric acid, while still including sufficient nitric acid to remove the metal-solvent catalyst from the PCD table 108. Additionally, the inventors currently believe that a relatively lower amount of nitric acid increases the useful life of masking materials and equipment that is exposed to the acid that may mask and/or hold the PDC 100 during leaching because nitric acid tends to react with (e.g., oxidize) the polymeric materials commonly used for the leaching cups.

The leaching agent including a mixture having hydrofluoric acid, nitric acid, and water may have a range of concentrations that exhibit unexpectedly rapid and effective removal of the at least one interstitial constituent and exhibit a relatively low viscosity. In any of the embodiments disclosed herein, the mixture may include only hydrofluoric acid, nitric acid, and water. However, in any of the embodiments disclosed herein, the mixture may include one or more additional constituents besides hydrofluoric acid, nitric acid, and water selected and composed to reduce the viscosity of the mixture. The one or more additional constituents may reduce the concentration of at least one of hydrofluoric acid, nitric acid, or water in any of the embodiments disclosed herein. For example, the one or more additional constituents may include acetonitrile.

In an embodiment, the composition of the low viscosity mixture includes hydrofluoric acid having a first concentration of about 10 weight % to about 50 weight %, nitric acid having a second concentration of about 5 weight % to about 25 weight % nitric acid, and water having a third concentration of about 25 weight % to about 85 weight %. In another embodiment, the first concentration of hydrofluoric acid is about 15 weight % to about 25 weight % and the second concentration of nitric acid is about 10 weight % to about 20 weight %. In another embodiment, the average viscosity of the mixture may be decreased if the composition of the mixture includes nitric acid in a second concentration of about 10 weight % to about 20 weight %. In another embodiment, the average viscosity of the mixture may be decreased if the composition of the mixture includes water in a third concentration of about 30 weight % to about 80 weight % and, in particular, about 40 weight % to about 80 weight %.

In another embodiment, the average viscosity of the mixture may be decreased if the composition of the mixture includes hydrofluoric acid in a first concentration of about 22 weight % to about 30 weight %, nitric acid having a second concentration of about 10 weight % to about 20 weight %, and water having a third concentration of about 50 weight % to about 68 weight %. In another embodiment, the mixture may include hydrofluoric acid in a first concentration of about 25 weight % to about 30 weight %, nitric acid having a second concentration of about 10 weight % to about 15 weight %, and water having a third concentration of about 55 weight % to about 65 weight %. In another embodiment, the mixture may include hydrofluoric acid in a first concentration of about 25 weight % to about 30 weight %, nitric acid having a second concentration of about 10 weight % to about 20 weight %, and water having a third concentration of about 55 weight % to about 65 weight %. In another embodiment, the mixture may include hydrofluoric acid having a first concentration of about 26 weight %, nitric acid having a second concentration of about 11 weight %, and water having a third concentration of about 63 weight %. In another embodiment, the mixture may include hydrofluoric acid having a first concentration of about 26 weight %, nitric acid having a second concentration of about 14 weight %, and water having a third concentration of about 60 weight %. In another embodiment, the mixture may include hydrofluoric acid having a first concentration of about 27 weight %, nitric acid having a second concentration of about 13 weight %, and water having a third concentration of about 60 weight %. In another embodiment, the mixture may include hydrofluoric acid having a first concentration of about 27 weight %, nitric acid having a second concentration of about 17 weight %, and water having a third concentration of about 56 weight %. In another embodiment, the mixture may include hydrofluoric acid having a first concentration of about 28 weight %, nitric acid having a second concentration of about 12 weight %, and water having a third concentration of about 60 weight %.

In another embodiment, the average viscosity of the mixture may be decreased if the composition of the mixture includes hydrofluoric acid in a first concentration of about 10 weight % to about 20 weight %, nitric acid having a second concentration of about 5 weight % to about 25 weight %, and water having a third concentration of about 57 weight % to about 86 weight %. In another embodiment, the mixture may include hydrofluoric acid in a first concentration of about 12 weight % to about 18 weight %, nitric acid having a second concentration of about 10 weight % to about 25 weight %, and water having a third concentration of about 57 weight % to about 78 weight %. In another embodiment, the mixture may include hydrofluoric acid in a first concentration of about 13 weight % to about 16 weight %, nitric acid having a second concentration of about 10 weight % to about 20 weight %, and water having a third concentration of about 64 weight % to about 78 weight %. In another embodiment, the mixture may include hydrofluoric acid having a first concentration of about 14 weight %, nitric acid having a second concentration of about 7 weight %, and water having a third concentration of about 79 weight %. In another embodiment, the mixture may include hydrofluoric acid having a first concentration of about 14 weight %, nitric acid having a second concentration of about 11 weight %, and water having a third concentration of about 75 weight %. In another embodiment, the mixture may include hydrofluoric acid having a first concentration of about 14 weight %, nitric acid having a second concentration of about 14 weight %, and water having a third concentration of about 72 weight %. In another embodiment, the mixture may include hydrofluoric acid having a first concentration of about 15 weight %, nitric acid having a second concentration of about 11 weight %, and water having a third concentration of about 74 weight %. In another embodiment, the mixture may include hydrofluoric acid having a first concentration of about 15 weight %, nitric acid having a second concentration of about 14 weight %, and water having a third concentration of about 71 weight %. In another embodiment, the mixture may include hydrofluoric acid having a first concentration of about 15 weight %, nitric acid having a second concentration of about 17 weight %, and water having a third concentration of about 68 weight %. In another embodiment, the mixture may include hydrofluoric acid having a first concentration of about 15 weight %, nitric acid having a second concentration of about 18 weight %, and water having a third concentration of about 67 weight %. In another embodiment, the mixture may include hydrofluoric acid having a first concentration of about 15 weight %, nitric acid having a second concentration of about 22 weight %, and water having a third concentration of about 63 weight %. In another embodiment, the mixture may include hydrofluoric acid having a first concentration of about 16 weight %, nitric acid having a second concentration of about 23 weight %, and water having a third concentration of about 61 weight %.

In another embodiment, the average viscosity of the mixture may be decreased if the composition of the mixture includes hydrofluoric acid in a first concentration of about 30 weight % to about 40 weight %, nitric acid having a second concentration of about 10 weight % to about 20 weight %, and water having a third concentration of about 40 weight % to about 60 weight %. In another embodiment, the mixture may include hydrofluoric acid in a first concentration of about 32 weight % to about 40 weight %, nitric acid having a second concentration of about 10 weight % to about 17 weight %, and water having a third concentration of about 43 weight % to about 58 weight %. In another embodiment, the mixture may include hydrofluoric acid having a first concentration of about 33 weight %, nitric acid having a second concentration of about 15 weight %, and water having a third concentration of about 52 weight %. In another embodiment, the mixture may include hydrofluoric acid having a first concentration of about 37 weight %, nitric acid having a second concentration of about 16 weight %, and water having a third concentration of about 47 weight %. In another embodiment, the mixture may include hydrofluoric acid having a first concentration of about 37 weight %, nitric acid having a second concentration of about 14 weight %, and water having a third concentration of about 49 weight %. In another embodiment, the mixture may include hydrofluoric acid having a first concentration of about 38 weight %, nitric acid having a second concentration of about 14 weight %, and water having a third concentration of about 48 weight %. In another embodiment, the mixture may include hydrofluoric acid having a first concentration of about 39 weight %, nitric acid having a second concentration of about 11 weight %, and water having a third concentration of about 50 weight %.

In another embodiment, a leaching agent exhibiting unexpectedly rapid and effective removal of the at least one interstitial constituent from the PCD table 108 may include at least one acid, and the leaching agent may have a viscosity less than about 0.55 centipoise ("cP") and, more particularly, less than about 0.5 cP at about 75° C. (e.g., about 0.25 cP to about 0.4 cP at about 75° C.). For example, the leaching agent may include a mixture having hydrofluoric acid, nitric acid, and water, and the leaching agent may exhibit a viscosity less than about 0.55 cP at about 75° C. For example, a mixture having a first concentration of hydrofluoric acid of about 28 weight %, a second concentration of nitric acid of about 12 weight %, and a third concentration of water of about 60 weight % may have a viscosity of about 0.45 cP at about 75° C.

In another embodiment, a leaching agent having an unexpectedly rapid and effective removal of the at least one interstitial constituent from the PCD table 108 may include a mixture having hydrofluoric acid, nitric acid, and water exhibiting a ratio of weight % hydrofluoric acid to weight % nitric acid of about 1.0 or greater, such as about 1.2 or greater, or about 1.5 or greater. A mixture having a ratio of weight % hydrofluoric acid to weight % nitric acid of about 1.0 or greater may exhibit a relatively low viscosity. Similarly, the mixture may exhibit a ratio of weight % hydrofluoric acid to weight % nitric acid of about 9 or less (e.g., about 1.0 to about 9, about 1.2 to about 9, or about 1.5 to about 9), such as about 4 or less (e.g., about 1.0 to about 4, about 1.2 to about 4, or about 1.5 to about 4), or about 2 or less (e.g., about 1.0 to about 2, about 1.2 to about 2, or about 1.5 to about 2). For example, a mixture having a ratio of weight % hydrofluoric acid to weight % nitric acid of about 9 or less may have sufficient nitric acid to remove the at least one interstitial constituent from the PCD table 108.

In another embodiment, a leaching agent having an unexpectedly rapid and effective removal of the at least one interstitial constituent from the PCD table 108 may include a mixture having hydrofluoric acid in a first concentration greater than about 15 weight %, nitric acid in a second concentration less than about 20 weight %, and a viscosity less than about 0.5 cP. In another embodiment, the mixture may include hydrofluoric acid having a first concentration greater than about 20 weight %, nitric acid in a second concentration less than about 20 weight %, and a viscosity less than about 0.4. In another embodiment, the mixture may include hydrofluoric acid having a first concentration greater than about 10 weight %, nitric acid in a second concentration of about 10 weight percent to about 20 weight %, and a viscosity less than about 0.5 cP. In another embodiment, the mixture may include hydrofluoric acid having a first concentration of about 15 weight % to about 25 weight % and nitric acid having a second concentration of about 10 weight % to about 20 weight %, and a viscosity of less than 0.4 cP.

In another embodiment, a leaching agent having an unexpectedly rapid and effective removal of the at least one interstitial constituent from the PCD table 108 may include a mixture of hydrofluoric acid or nitric acid in a first concentration, and a viscosity less than about 0.4 cP. For example, the mixture may include hydrofluoric acid having a first concentration greater than about 25 weight %. In another embodiment, the mixture may include nitric acid having a first concentration less than about 25 weight %. In another embodiment, the mixture may include nitric acid having a first concentration less than about 25 weight % and at least one additional acid in a second concentration greater than 0 weight %. In another embodiment, the mixture may include a first concentration of nitric acid less than about 20 weight %.

In another embodiment, a leaching agent having an unexpectedly rapid and effective removal of the at least one interstitial constituent from the PCD table 108 may include a mixture having hydrofluoric acid in a first concentration greater than 0 weight %, nitric acid in a second concentration less than about 15 weight %, and a viscosity less than about 0.5 cP. In another embodiment, the mixture may include hydrofluoric acid in a first concentration greater than 0 weight %, nitric acid in a second concentration less than about 15 weight %, and a viscosity less than about 0.5 cP at a temperature greater than about 75° C.

Referring back to FIG. 1B, after the HPHT process, the PCD table 108 may be leached using a leaching agent including any of the mixtures disclosed herein to remove at least a portion of the interstitial constituent (e.g., a catalyst or an infiltrant) to a selected depth "d" measured from one or more of the upper surface 112, the chamfer 116, or the at least one lateral surface 114. In an embodiment, the PDC 100 may be positioned in a protective leaching cup 118. The protective leaching cup 118 may be configured to receive the PDC 100. The protective leaching cup 118 may include a seal contact portion 120 configured to contact and form a seal against the PDC 100. The seal contact portion 120 may contact one or more portions of at least one lateral surface 114 of the PDC when the PDC 100 is at least partially positioned within the protective leaching cup 118. The seal contact portion 120 may be partially or fully impermeable to various fluids, such as the leaching agent. As such, the protective leaching cup 118 may limit or prevent the leaching agent from substantially chemically damaging certain portions of the PDC 100, for example, the substrate 106 and/or a selected portion of the PCD table 108 during the leaching process. In the illustrated embodiment, only the upper surface 112, the chamfer 116 and a portion of the at least one lateral surface 114 are exposed to the leaching agent. The protective leaching cup 118 may be at least partially formed from polyethylene (e.g., linear low density polyethylene), polypropylene, chlorosulfanted polyethylene, chlorinated polyethylene, fluoropolymer, perfluoroalkoxy, Kynar®, Viton®, another suitable polymer, or combinations thereof. Examples of protective leaching cups that may be used in any of the leaching methods disclosed herein are disclosed in U.S. patent application Ser. No. 14/084,058, the disclosure of which is incorporated herein, in its entirety, by this reference.

In an embodiment, the PDC 100 positioned in the protective leaching cup 118 may be placed in an extraction vessel 122, and a flow of a leaching agent 124 including any of the mixtures discussed herein may be provided via one or more entry valves 126 into an interior chamber 128 of the extraction vessel 122. However, in other embodiments, the leaching agent 124 may not be flowed over the PDC 100 and may be generally stagnant. The extraction vessel 122 containing the PDC 100 positioned in the protective leaching cup 118 and the leaching agent 124 may be subsequently heated and/or pressurized (e.g., via a pump and/or heating element that is not shown) sufficiently to at least partially remove the at least one interstitial constituent the PCD table 108, thereby forming the at least partially leached PCD table 136, as shown in FIG. 1C. The leaching agent 124 may be removed from the extraction vessel via an exit valve 130. While the extraction vessel 122 described herein is shown with the entry valve 126 and/or exit valve 130 (e.g., the leaching agent 124 may flow through the vessel or may be re-filled or recharged as needed), it is understood that the extraction vessel 122 may not include the entry valve 126 and/or exit valve 130 (e.g., the leaching agent 124 may be introduced and/or removed from the vessel in any suitable manner, without limitation) or may be any suitable extraction vessel, container, or system.

The extraction vessel 122 and the leaching agent 124 may exhibit a temperature that facilitates removal of the at least one interstitial constituent of the PCD table 108. Increasing the temperature of the extraction vessel 122 and the leaching agent 124 during the leaching process may improve the diffusion of the leaching agent into and from the interstitial regions of the PCD table 108. However, the temperature of the extraction vessel 122 and the leaching agent 124 may be limited based on the composition of the leaching agent and the limits of the extraction vessel 122 and/or leaching cup or masking material. In an embodiment, the temperature of the leaching agent 124 in the extraction vessel 122 may be less than about 120° C., such as about 10° C. to about 50° C. or about 50° C. to about 100° C. For example, the leaching agent 124 may exhibit a temperature of about 75° C. during the leaching process. In another embodiment, the leaching agent 124 may exhibit a temperature during the leaching process greater than about 25° C., such as greater than about 50° C., greater than about 75° C., or greater than about 120° C.

The extraction vessel 122 and the leaching agent 124 may exhibit a pressure that facilitates removal of the at least one interstitial constituent from at least a portion of the PCD table 108. In an embodiment, the extraction vessel 122 and the leaching agent 124 may exhibit a pressure of about 1 atmosphere or greater, such as about 1 atmosphere to 100 atmosphere. Alternatively, the extraction vessel 122 may exhibit a pressure less than about 1 atmosphere.

The PCD table 108 may be leached for a few hours to a few months (e.g., more than 1000 hours). In an embodiment, the PCD table 108 may be leached for less than one day, less than about 50 hours, or less than one week. In another embodiment, the PCD table may be leached for more than about 100 hours, such as about 120 hours to about 160 hours, or about 112 hours to about 150 hours. The duration and conditions of the leaching process may be determined by a variety of factors including the composition of the mixture of the leaching agent 124 used, the temperature of the leaching agent 124, pressure inside the extraction vessel 122, the at least one interstitial constituent to be removed from the PCD table 108, the pore size of the PCD table 108, a desired leach depth, the percentage of the at least one interstitial constituent to be removed from the leached portion of the PCD table 108, or combinations thereof. In various embodiments, the leach depth may be about 50 μm to about 800 μm or greater than about 800 μm. For example, the leach depth may be about 50 μm to about 300 μm, about 300 μm to about 500 μm, about 500 μm to about 800 μm, 300 μm to about 600 μm, or about 400 μm to about 500 μm. The leach depth and the amount of the at least one interstitial constituent removed from the PCD table 108 may be selected based on the intended use of the PDC 100.

Referring to FIG. 1C, after the leaching process, the at least partially leached PCD table 136 may have the at least one interstitial constituent removed to a selected depth "d" measured from one or more of the upper surface 112, the chamfer 116, or a portion of the at least one lateral surface 114 to an intermediate location to form a leached region 132. Similarly, the at least partially leached PCD table 136 may include an un-leached region 134 that extends from the substrate 106 to the intermediate location. In an embodiment, the leached region 132 may generally contour the upper surface 112, the chamfer 116, and the at least one lateral surface 114. The leached region 132 may extend along a selected length of the at least one lateral surface 114. In an embodiment, a residual amount of the at least one interstitial constituent may be present in the leached region 132 even after leaching. For example, the at least one interstitial constituent may comprise about 0.8 weight % to about 1.50 weight % and, more particularly, about 0.9 weight % to about 1.2 weight % of the leached region 132.

Other leach depth profiles may be formed rather than the leach depth profile shown in FIG. 1C by appropriately masking the PCD table 108 or appropriately using the protective leaching cups 118. Examples of different leach depth profiles including non-uniform leach depth profiles that may be achieved by the methods, compositions, and/or systems disclosed herein are disclosed in U.S. Pat. No. 8,596,387, which is incorporated herein, in its entirety, by this reference.

FIGS. 2A-2D are cross-sectional views illustrating different stages in a method of fabricating a PDC 242 according to an embodiment that includes forming a PCD table 208 from a mass of diamond particles and a catalyst in a first HPHT process. The sintered PCD table 208 is at least partially leached to remove at least one interstitial constituent therefrom by exposing the formed PCD table 208 to a leaching agent including any of the mixtures included herein. A PDC 242 may be formed by bonding the at least partially leached PCD table 236 to a substrate 240 in a second HPHT process. Such a method may provide for more effective leaching of the interstitial material from the PCD table 208/244 before and/or after bonding to the substrate 240.

Figure 2A:
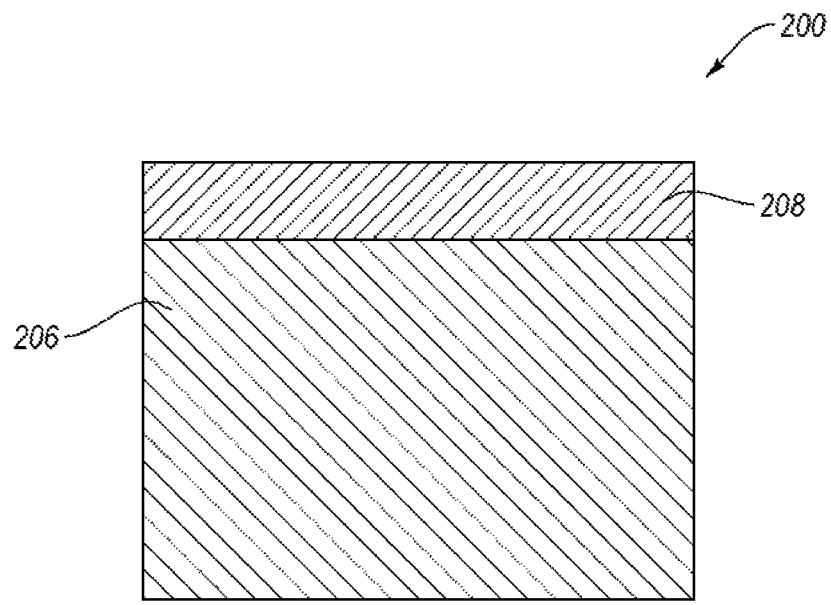
FIGS. 2A-2D are cross-sectional views illustrating different stages in a method of fabricating a PDC in which a leaching agent that includes a mixture having hydrofluoric acid, nitric acid, and water is used to leach the PCD table according to an embodiment.

Referring to FIG. 2A, a PDC 200 may be provided that includes a PCD table 208 bonded to a substrate 206. The PDC 200 may be made in the same manner as the PDC 100 shown in FIG. 1A. For example, the PDC 200 may be formed by placing a mass of diamond particles adjacent to a substrate to form an assembly. The assembly may be placed in a pressure transmitting medium and subjected to a first HPHT process similar to the HPHT process described in FIG. 1A. As such, the PCD table 208 may include a plurality of diamond particles bonded together defining a plurality of interstitial region. The plurality of interstitial regions may be at least partially occupied by at least one interstitial constituent. The PCD table 208 may be separated from the substrate 206 using a lapping process, a grinding process, wire-electrical-discharge machining, combinations thereof, or another suitable material removal process.

Alternatively, the PCD table 208 may be formed without a substrate. In an embodiment, a mass of diamond particles including a catalyst material mixed therein may be positioned in a pressure transmitting medium and subjected to a first HPHT process. The catalyst mixed therein may facilitate intergrowth between the mass of diamond particles and form the PCD table 208 including directly bonded-together diamond grains defining a plurality of interstitial regions with the catalyst disposed within at least a portion of the plurality of interstitial regions. In another embodiment, a mass of diamond particles may be positioned adjacent to a catalyst material source (e.g., a disk or a cobalt-cemented tungsten carbide substrate) to form an assembly. The assembly may be placed in a pressure transmitting medium and subjected to a first HPHT process. Further, the catalyst may liquefy and infiltrate the mass of diamond particles during the HPHT process thereby facilitating intergrowth between the mass of diamond particles to form the PCD table 208 including bonded diamond grains having a plurality of interstitial regions at least partially occupied by the catalyst. In this embodiment, the PCD table 208 may be separated from the catalyst material source using a lapping process, a grinding process, wire-electrical-discharge machining, a leaching process, combinations thereof, or another suitable material removal process.

Figure 2B:
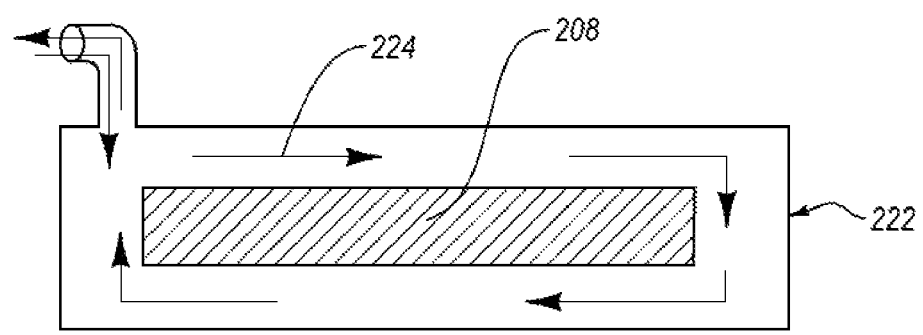

Referring now to FIG. 2B, the at least one interstitial constituent may be removed from the PCD table 208 using a leaching agent 224 that includes any of the mixtures described herein. In an embodiment, the PCD table 208 may be enclosed in an extraction vessel 222 containing a leaching agent 224 to remove at least a portion of the at least one interstitial constituent thereby forming an at least partially leached PCD table 236. The leaching agent 224 may be heated and may be pressurized using the same or similar conditions described with respect to FIG. 1B. In an embodiment, the PCD table 208 may be positioned in the extraction vessel 222 and leached for a time sufficient to remove at least a portion of the at least one interstitial constituent from substantially the entire PCD table 208. In another embodiment, the PCD table 208 may be positioned in the extraction vessel 222 for a time sufficient to remove at least a portion of the at least one interstitial constituent from a select region or depth measured from each surface of the PCD table 208. In another embodiment, a portion of the PCD table 208 may be masked (e.g., using electrodeposition or plasma deposition of a masking material on the PDC 200) or the PCD table 208 may be positioned in a protective leaching cup prior to being leached.

Figure 2C:
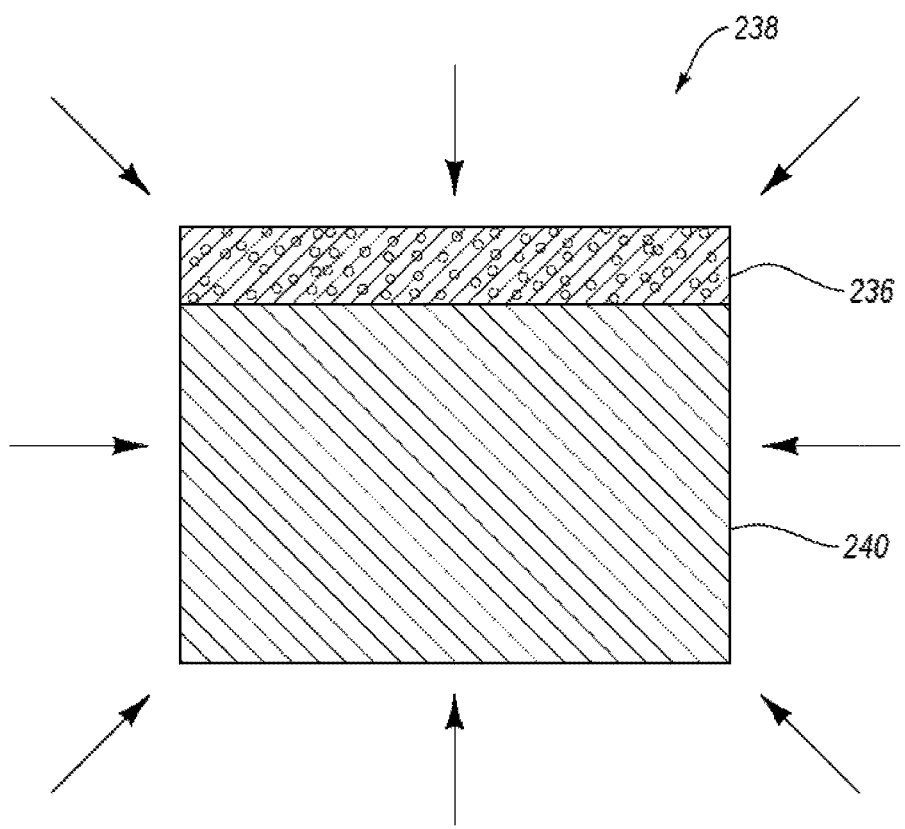

FIG. 2C illustrates a cross-sectional view of an assembly 238 including the at least partially leached PCD table 236 positioned adjacent to a substrate 240. In an embodiment, the substrate 240 may be made from the same materials as the substrate 106 discussed above. The at least partially leached PCD table 236 may include a plurality of interstitial regions that were previously occupied by the at least one interstitial constituent and form a network of at least partially interconnected pores.

Figure 2D:
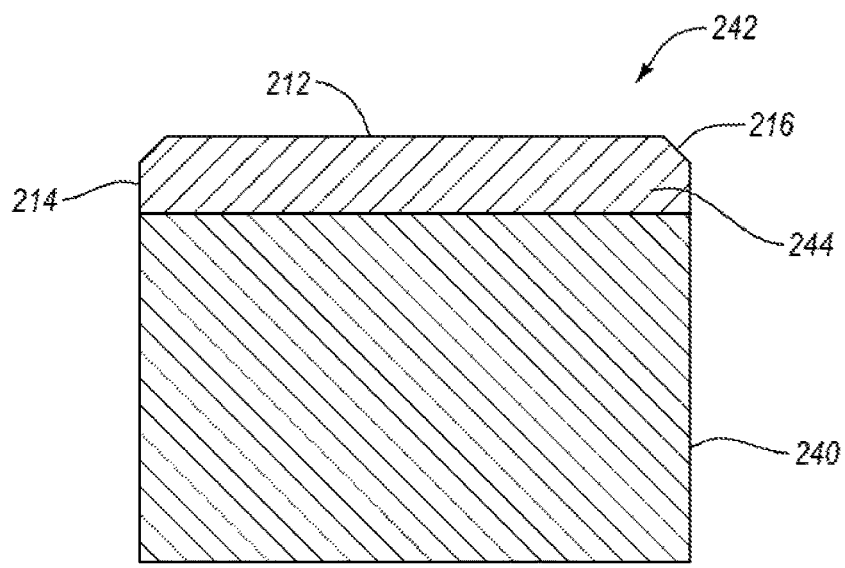

Referring to FIG. 2C, the assembly 238, including the at least partially leached PCD table 236 and the substrate 240, may be placed in a pressure transmitting medium. The pressure transmitting medium, including the assembly 238, may be subjected to a second HPHT process. The second HPHT process conditions may be similar to or the same as the HPHT process conditions described in FIG. 1A. The second HPHT process bonds the at least partially leached PCD table 236 to the substrate 240 and may cause at least one infiltrant from the substrate 240 (e.g., cobalt, nickel, iron, alloys thereof, or another cementing constituent) or from another source to at least partially infiltrate the at least partially leached PCD table 236. Referring to FIG. 2D, the PDC 242 so-formed includes an infiltrated PCD table 244 in which the interstitial regions thereof are at least partially occupied by the at least one infiltrant from the substrate 240 or from another source.

In some embodiments, the formed PDC 242 may be subjected to a number of different shaping operations. For example, an upper working surface 212 may be planarized and/or polished. Additionally, a peripherally-extending chamfer 216 may be formed that extends between the upper working surface 212 and at least one lateral surface 214 of the infiltrated PCD table 244. The shaping operations may include lapping, grinding, wire EDM, combinations thereof, or another suitable material-removal process. Alternatively, the PCD table 208 may be subjected to the shaping operations prior to leaching the PCD table 208.

In an embodiment, the infiltrated PCD table 244 of the PDC 242 may be leached using a leaching agent including any of the mixtures disclosed herein to remove at least a portion of the at least one infiltrant from the infiltrated PCD table 244. For example, the at least one infiltrant may be removed from the infiltrated PCD table 244 from one or more exterior surfaces thereof using a method similar to or the same as the leaching process described with respect FIG. 1B to form a leached region in the PCD table thereof similar to or the same as the leached region 132 shown in FIG. 1B. In an embodiment, the infiltrated PCD table 244 of the PDC 242 may be positioned at least partially into any of the protective leaching cups disclosed herein. The PDC 242 may be positioned in the protective leaching cup and placed in an extraction vessel containing any of the leaching agents comprising any of the mixtures disclosed herein. The infiltrated PCD table 244 may have the at least one infiltrant removed to a selected depth "d" measure from one or more of the upper surface 212, the chamfer 216, or the at least one lateral surface 214. Similar to the at least partially leached PCD table 136 shown in FIG. 1C, removing the at least one infiltrant from the infiltrated PCD table 244 may form a porous leached region that is depleted of the at least one infiltrant, with a non-porous region located between the porous leached region and the substrate. For example, the porous leached region may generally contour the upper surface 212, the chamfer 216, and/or at least a portion of the at least one lateral surface 214. In an embodiment, a residual amount of the at least one infiltrant may be present in the porous leached region even after the leaching process in a residual amount, such as about 0.8 weight % to about 1.50 weight % and, more particularly, about 0.9 weight % to about 1.2 weight % of the leached region.

Figure 3A:
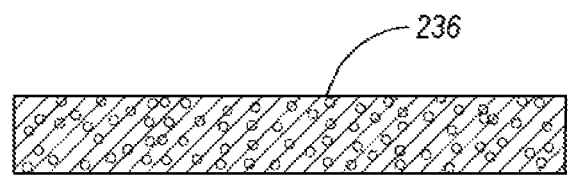
FIGS. 3A and 3B are cross-sectional views illustrating different stages in a method of removing leaching by-products from a PCD table according to an embodiment.

For ease of reference, the following description refers to the PCD table 208 and an at least partially leached diamond table 236 that may be formed from the PCD table 208. However, it is understood that in the following description, any of the PCD tables disclosed herein can be used instead of the PCD table 208 and the at least partially leached diamond table 236. Referring to FIG. 3A, in an embodiment, an at least partially leached PCD table 236 may include leaching by-products as a result of the leaching process used to remove at least one interstitial constituent from the PCD table 208 (FIGS. 2A and 2B). For example, a leaching agent used to remove the at least one interstitial constituent may leave one or more types of residual salts, one or more types of oxides, combinations of the foregoing, or another leaching by-product within at least some of the interstitial regions of the at least partially leached PCD table 236. In an embodiment where the at least partially leached PCD table 236 was formed using a cobalt-cemented tungsten carbide substrate and was leached using a leaching agent including any of the mixtures disclosed herein, the residual salt may be a salt of nitric acid or hydrochloric acid such as cobalt nitrate or cobalt chloride. The leaching by-products may also include a metal oxide, such as an oxide of tungsten or cobalt. It is currently believed that leaching by-products may block, obstruct, or otherwise inhibit infiltration of the at least partially leached PCD table 236 with at least one infiltrant when the at least partially leached PCD table 236 is bonded to the substrate 240 (FIGS. 2C and 2D). Additionally, leaching by-products may inhibit back filling with a non-catalyst material such as silicon.

Figure 3B:
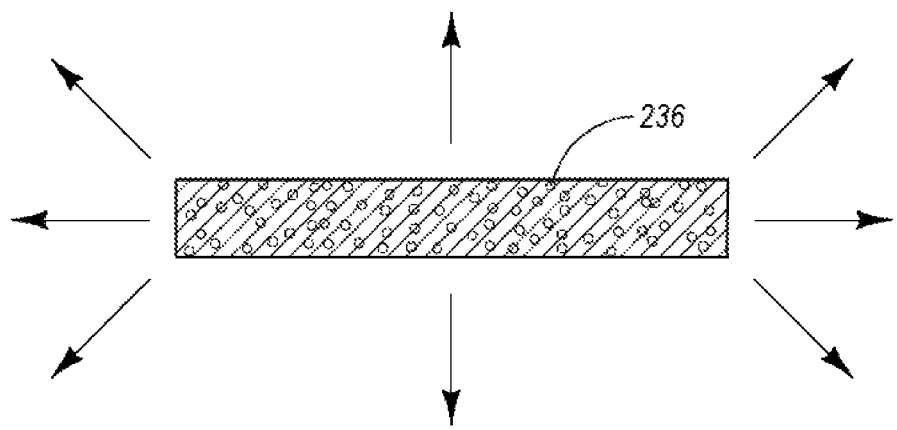

At least some of the leaching by-products may be removed from the at least partially leached PCD table 236. For example, as shown in FIG. 3B, at least some of the leaching by-products may be removed by subjecting the at least partially leached PCD table 236 to a thermal-cleaning process. In such a thermal-cleaning process, the at least partially leached PCD table 236 may be heated under partial vacuum (e.g., at a pressure less than ambient atmospheric pressure) or ambient pressure to a temperature sufficient to sublimate at least some of the leaching by-products present in the at least partially leached PCD table 236, but below a temperature at which the diamond grains of the at least partially leached PCD table 236 may significantly degrade. For example, the at least partially leached PCD table 236 may be heated in a vacuum furnace at a temperature at about 500° C. or greater and/or about 700° C. or less for about 0.5 hours to about 2.0 hours or more. In an embodiment, the at least partially leached PCD table 236 may be heated in a vacuum furnace at a temperature of about 650° C. for about 1 hour to about 1.5 hours.

In another embodiment, the at least partially leached PCD table 236 may be cleaned using an autoclave under diamond-stable conditions in which heat and pressure is applied at a temperature and pressure sufficient to sublimate at least some of the leaching by-products present in the at least partially leached PCD table 236. Suitable elevated temperature levels used in the autoclave process may range from approximately the boiling point of the leaching agent and/or the leaching by-products to three times the boiling point of the leaching agent and/or the leaching by-products. For example, in an embodiment, the elevated temperature of the autoclave process may be about 90° C. to about 350° C., such as about 175° C. to about 225° C. In other embodiments, the elevated temperature may be up to about 300° C. The pressure of the autoclave process may be selected so that diamond-stable or non-stable conditions are used, such as a pressure of about 0.5 MPa to about 3 GPa (e.g., about 1 GPa to about 2 GPa).

In another embodiment, at least some of the leaching by-products may be removed from the at least partially leached PCD table 236 using a chemical cleaning process. For example, the at least partially leached PCD table 236 may be immersed in hydrofluoric acid. The concentration of the hydrofluoric acid and the immersion time of the at least partially leached PCD table 236 in the hydrofluoric acid may be selected so that at least some of the leaching by-products and, in some embodiments, substantially all of the leaching by-products may be removed from the at least partially leached PCD table 236. In other embodiments, nitric acid, sulfuric acid, hydrochloric acid, hydrogen peroxide, phosphoric acid, perchloric acid, any combination of foregoing acids, or the like, may be selected in place of hydrofluoric acid as a chemical cleaning agent.

Additional details about techniques for cleaning the at least partially leached PCD table 236 that may be used in combination with any of the leaching techniques disclosed herein may be found in U.S. Pat. No. 7,845,438. U.S. Pat. No. 7,845,438 is incorporated herein, in its entirety, by this reference.

The following working examples provide further detail in connection with the specific embodiments described above.

Working Example 1

A PDC was fabricated according to the following method. A mass of diamond particles was placed adjacent to a cobalt-cemented tungsten carbide substrate. The mass of diamond particles included a plurality of diamond particles exhibiting an average particle size of about 29 μm. The mass of diamond particles and the substrate were positioned within a pyrophyllite cube, and subjected to an HPHT process at a temperature of about 1400° C. and a cell pressure of at least about 7 GPa to sinter the mass of diamond particles to form a PCD table and attach the resulting PCD table to the substrate.

The PDC was placed in a protective leaching cup and exposed to a leaching agent. The leaching agent included a mixture having hydrofluoric acid in a first concentration of about 15 weight %, nitric acid in a second concentration of about 22 weight %, and water in a third concentration of about 63 weight %. The leaching agent was heated to about 75° C. Exposing the PDC to the leaching agent for about 72 hours yielded an average leach depth of about 296 μm in the PCD table. Exposing the PDC to the leaching agent for about 144 hours yielded an average leach depth of about 393 μm in the PCD table.

Working Example 2

A PDC is fabricated using the same method described in Working Example 1. The resulting PDC was placed in a protective leaching cup and exposed to a leaching agent. The leaching agent included a mixture having hydrofluoric acid in a first concentration of about 15 weight %, nitric acid in a second concentration of about 18 weight %, and water in a third concentration of about 67 weight %. The leaching agent was heated to about 75° C. Exposing the PDC to the leaching agent for about 72 hours yielded an average leach depth of about 208 μm in the PCD table. Exposing the PDC to the leaching agent for about 144 hours yielded an average leach depth of about 390 μm in the PCD table.

Working Example 3

A PDC is fabricated using the same method described in Working Example 1. The resulting PDC was placed in a protective leaching cup and exposed to a leaching agent. The leaching agent included a mixture having hydrofluoric acid in a first concentration of about 15 weight %, nitric acid in a second concentration of about 14 weight % and water in a third concentration of about 71 weight %. The leaching agent was heated to about 75° C. Exposing the PDC to the leaching agent for about 72 hours yielded an average leach depth of about 343 μm in the PCD table. Exposing the PDC to the leaching agent for about 144 hours yielded an average leach depth of about 396 μm in the PCD table.

Working Example 4

A PDC is fabricated using the same method described in Working Example 1. The resulting PDC was placed in a protective leaching cup and exposed to a leaching agent. The leaching agent included a mixture having hydrofluoric acid in a first concentration of about 27 weight %, nitric acid in a second concentration of about 17 weight % and water in a third concentration of about 56 weight %. The leaching agent was heated to about 75° C. Exposing the PDC to the leaching agent for about 72 hours yielded an average leach depth of about 326 µm in the PCD table. Exposing the PDC to the leaching agent for about 144 hours yielded an average leach depth of about 439 µm in the PCD table.

Working Example 5

A PDC is fabricated using the same method described in Working Example 1. The resulting PDC was placed in a protective leaching cup and exposed to a leaching agent. The leaching agent included a mixture having hydrofluoric acid in a first concentration of about 37 weight %, nitric acid in a second concentration of about 16 weight % and water in a third concentration of about 47 weight %. The leaching agent was heated to about 75° C. Exposing the PDC to the leaching agent for about 72 hours yielded an average leach depth of about 285 µm in the PCD table. Exposing the PDC to the leaching agent for about 144 hours yielded an average leach depth of about 414 µm in the PCD table.

Working Example 6

A PDC is fabricated using the same method described in Working Example 1. The resulting PDC was placed in a protective leaching cup and exposed to a leaching agent. The leaching agent included a mixture having hydrofluoric acid in a first concentration of about 14 weight %, nitric acid in a second concentration of about 14 weight % and water in a third concentration of about 72 weight %. The leaching agent was heated to about 75° C. and the PDC remained exposed to the leaching agent for about 144 hours. After leaching, the average leach depth of the PCD table was measured to be about 429 µm.

Working Example 7

A PDC is fabricated using the same method described in Working Example 1. The resulting PDC was placed in a protective leaching cup and exposed to a leaching agent. The leaching agent included a mixture having hydrofluoric acid in a first concentration of about 14 weight %, nitric acid in a second concentration of about 11 weight % and water in a third concentration of about 75 weight %. The leaching agent was heated to about 75° C. and the PDC remained exposed to the leaching agent for about 144 hours. After leaching, the average leach depth of the PCD table was measured to be about 392 µm.

Working Example 8

A PDC is fabricated using the same method described in Working Example 1.
The resulting PDC was placed in a protective leaching cup and exposed to a leaching agent. The leaching agent included a mixture having hydrofluoric acid in a first concentration of about 14 weight %, nitric acid in a second concentration of about 7 weight % and water in a third concentration of about 79 weight %. The leaching agent was heated to about 75° C. and the PDC remained exposed to the leaching agent for about 144 hours. After leaching, the average leach depth of the PCD table was measured to be about 362 µm.

Working Example 9

A PDC is fabricated using the same method described in Working Example 1. The resulting PDC was placed in a protective leaching cup and exposed to a leaching agent. The leaching agent included a mixture having hydrofluoric acid in a first concentration of about 26 weight %, nitric acid in a second concentration of about 14 weight % and water in a third concentration of about 60 weight %. The leaching agent was heated to about 75° C. and the PDC remained exposed to the leaching agent for about 144 hours. After leaching, the average leach depth of the PCD table was measured to be about 426 µm.

Working Example 10

A PDC is fabricated using the same method described in Working Example 1. The resulting PDC was placed in a protective leaching cup and exposed to a leaching agent. The leaching agent included a mixture having hydrofluoric acid in a first concentration of about 38 weight %, nitric acid in a second concentration of about 14 weight % and water in a third concentration of about 48 weight %. The leaching agent was heated to about 75° C. and the PDC remained exposed to the leaching agent for about 144 hours. After leaching, the average leach depth of the PCD table was measured to be about 391 µm.

Working Example 11

A PDC is fabricated using the same method described in Working Example 1. The resulting PDC was placed in a protective leaching cup and exposed to a leaching agent. The leaching agent included a mixture having hydrofluoric acid in a first concentration of about 26 weight %, nitric acid in a second concentration of about 11 weight % and water in a third concentration of about 63 weight %. The leaching agent was heated to about 75° C. and the PDC remained exposed to the leaching agent for about 144 hours. After leaching, the average leach depth of the PCD table was measured to be about 416 µm.

Working Example 12

A PDC is fabricated using the same method described in Working Example 1. The resulting PDC was placed in a protective leaching cup and exposed to a leaching agent. The leaching agent included a mixture having hydrofluoric acid in a first concentration of about 26 weight %, nitric acid in a second concentration of about 11 weight % and water in a third concentration of about 63 weight %. The leaching agent was heated to about 90° C. and the PDC was exposed to the leaching agent for about 144 hours. After leaching, the average leach depth of the PCD table was measured to be about 469 µm.

Working Example 13

A PDC is fabricated using the same method described in Working Example 1. The resulting PDC was placed in a protective leaching cup and exposed to a leaching agent. The leaching agent included a mixture having hydrofluoric acid in a first concentration of about 16 weight %, nitric acid in a second concentration of about 23 weight % and water in a third concentration of about 61 weight %. The leaching agent was heated to about 75° C. and the PDC remained exposed to the leaching agent for about 144 hours. After leaching, the average leach depth of the PCD table was measured to be about 385 µm.

Figure 4:
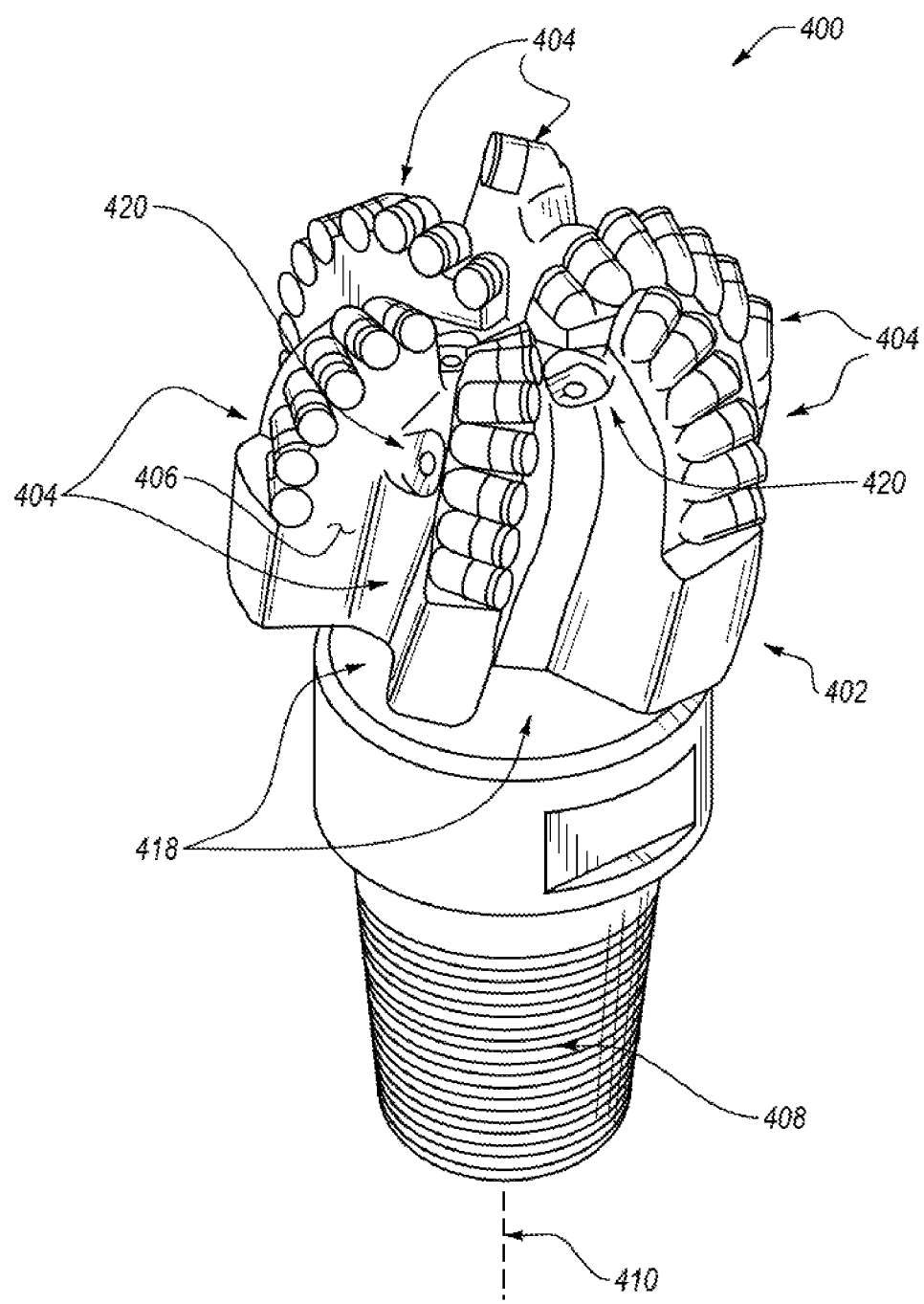
FIG. 4 is an isometric view of a rotary drill bit according to an embodiment that may employ one or more of the PDCs fabricated according to any of the embodiments disclosed herein.
Figure 5:
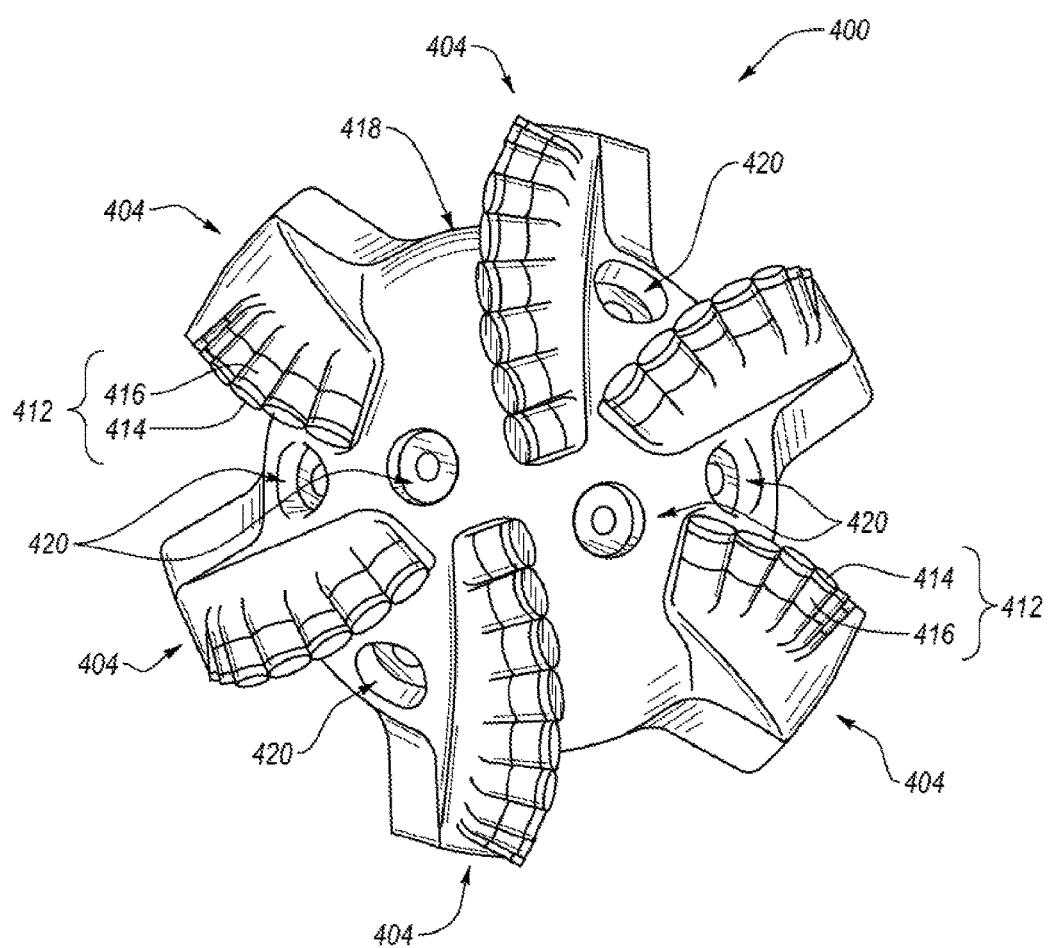
FIG. 5 is a top elevation view of the rotary drill bit shown in FIG. 4.

FIG. 4 is an isometric view and FIG. 5 is a top elevation view of a rotary drill bit 400 according to an embodiment. The rotary drill bit 400 includes at least one PDC fabricated according to any of the embodiments disclosed herein. The rotary drill bit 400 comprises a bit body 402 that includes radially and longitudinally extending blades 404 with leading faces 406, and a threaded pin connection 408 for connecting the bit body 402 to a drilling string. The bit body 402 defines a leading end structure configured for drilling into a subterranean formation by rotation about a longitudinal axis 410 and application of weight-on-bit. At least one PDC cutting element 412, manufactured and configured according to any of the previously described PDC embodiments (e.g., the PDC 100 shown in FIG. 1C or the PDC 242 shown in FIG. 2D after being leached to remove at least one infiltrant therefrom), may be affixed to rotary drill bit 400 by, for example, brazing, mechanical affixing, or another suitable technique. Each PDC 412 is secured to the blades 404. For example, each PDC 412 may include a PCD table 414 bonded to a substrate 416. More generally, the PDCs 412 may comprise any PDC disclosed herein, without limitation. In addition, if desired, in an embodiment, a number of the PDCs 412 may be conventional in construction. Also, circumferentially adjacent blades 404 define so-called junk slots 418 therebetween, as known in the art. Additionally, the rotary drill bit 400 includes a plurality of nozzle cavities 420 for communicating drilling fluid from the interior of the rotary drill bit 400 to the PDCs 412.

FIGS. 4 and 5 merely depict one embodiment of a rotary drill bit that employs at least one cutting element comprising a PDC fabricated and structured in accordance with the disclosed embodiments, without limitation. The rotary drill bit 400 is used to represent any number of earth-boring tools or drilling tools, including, for example, core bits, roller-cone bits, fixed-cutter bits, eccentric bits, bicenter bits, reamers, reamer wings, mining rotary drill bits, or any other downhole tool including PDCs, without limitation.

The PDCs disclosed herein may also be utilized in applications other than rotary drill bits. For example, the disclosed PDC embodiments may be used in thrust-bearing assemblies, radial bearing assemblies, wire-drawing dies, artificial joints, machining elements, PCD windows, and heat sinks.

Figure 6:
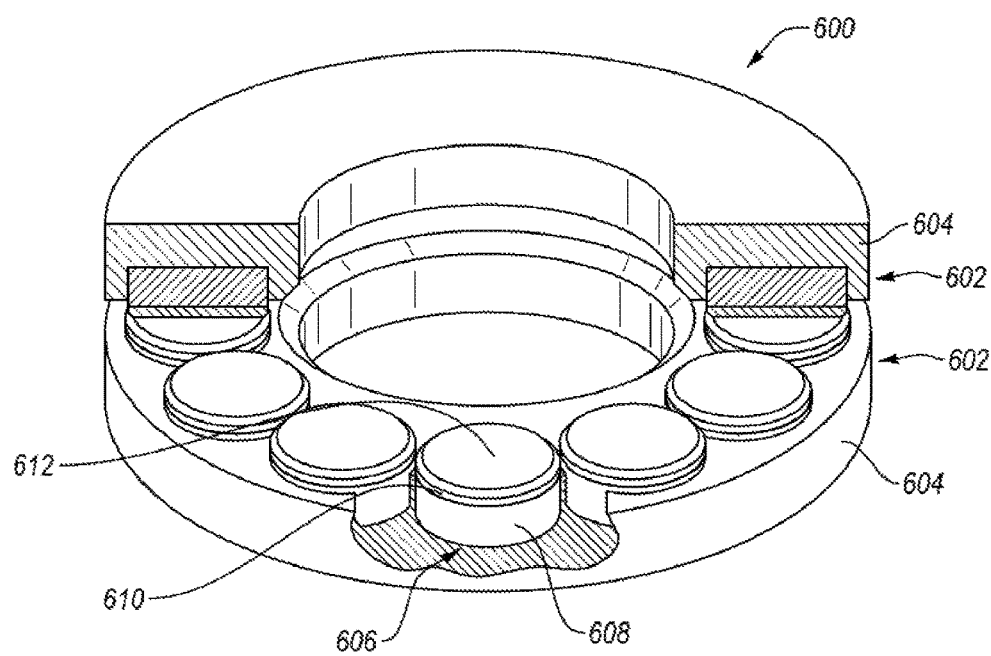
FIG. 6 is an isometric cut-away view of a thrust-bearing apparatus according to an embodiment, which may utilize any of the disclosed PDC fabricated according to any of the embodiments disclosed herein as bearing elements.

FIG. 6 is an isometric cut-away view of a thrust-bearing apparatus 600 according to an embodiment, which may utilize any of the PDCs fabricated according to any of the embodiments disclosed herein. The thrust-bearing apparatus 600 includes respective thrust-bearing assemblies 602. Each thrust-bearing assembly 602 includes an annular support ring 604 that may be fabricated from a material, such as carbon steel, stainless steel, or another suitable material. Each support ring 604 includes a plurality of recesses (not labeled) that receives a corresponding bearing element 606. Each bearing element 606 may be mounted to a corresponding support ring 604 within a corresponding recess by brazing, press-fitting, using fasteners, combinations thereof, or another suitable mounting technique. One or more, or all of bearing elements 606 may be manufactured and configured according to any of the disclosed PDC embodiments. For example, each bearing element 606 may include a substrate 608 and a PCD table 610, with the PCD table 610 including a bearing surface 612.

In use, the bearing surfaces 612 of one of the thrust-bearing assemblies 602 bears against the opposing bearing surfaces 612 of the other one of the bearing assemblies 602. For example, one of the thrust-bearing assemblies 602 may be operably coupled to a shaft to rotate therewith and may be termed a "rotor." The other one of the thrust-bearing assemblies 602 may be held stationary and may be termed a "stator."

Figure 7:
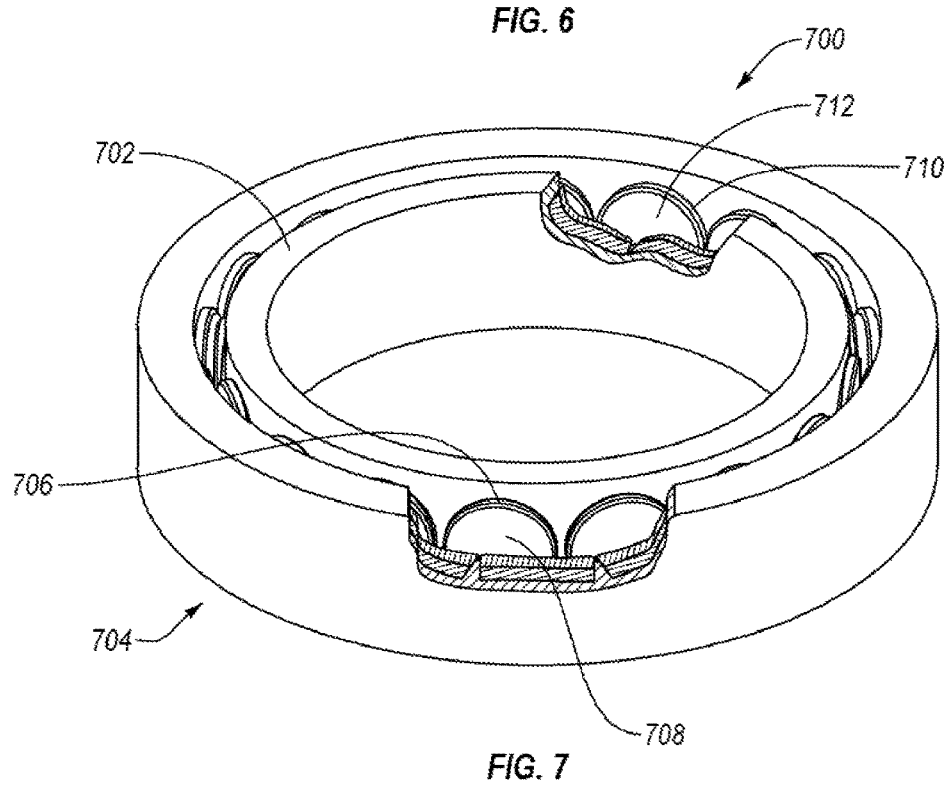
FIG. 7 is an isometric cut-away view of a radial bearing apparatus according to an embodiment, which may utilize any of the disclosed PDC fabricated according to any of the embodiments disclosed herein as bearing elements.

FIG. 7 is an isometric cut-away view of a radial bearing apparatus 700 according to an embodiment, which may utilize any of the PDCs fabricated according to any of the embodiments disclosed herein. The radial bearing apparatus 700 includes an inner race 702 positioned generally within an outer race 704. The outer race 704 includes a plurality of bearing elements 706 affixed thereto that have respective bearing surfaces 708. The inner race 702 also includes a plurality of bearing elements 710 affixed thereto that have respective bearing surfaces 712. One or more, or all of the bearing elements 706 and 710 may be configured according to any of the PDC embodiments disclosed herein. The inner race 702 is positioned generally within the outer race 704, with the inner race 702 and outer race 704 configured so that the bearing surfaces 708 and 712 may at least partially contact one another and move relative to each other as the inner race 702 and outer race 704 rotate relative to each other during use.

While various aspects and embodiments have been disclosed herein, other aspects and embodiments are contemplated. The various aspects and embodiments disclosed herein are for purposes of illustration and are not intended to be limiting. Additionally, the words "including," "having," and variants thereof (e.g., "includes" and "has") as used herein, including the claims, shall be open ended and have the same meaning as the word "comprising" and variants thereof (e.g., "comprise" and "comprises").

We claim:

1. A method of fabricating an at least partially leached polycrystalline diamond table, the method comprising;
    providing a polycrystalline diamond table including a plurality of bonded diamond grains defining a plurality of interstitial regions at least a portion of which include at least one interstitial constituent disposed therein; and
    leaching the polycrystalline diamond table with a leaching agent to remove at least a portion the at least one interstitial constituent from the polycrystalline diamond table to form an at least partially leached polycrystalline diamond table, wherein the leaching agent includes a mixture having a ratio of weight % hydrofluoric acid to weight % nitric acid of about 1.0 to about 2.4, and water in a concentration of about 50 weight % to about 85 weight %.

2. The method of claim 1, wherein leaching the polycrystalline diamond table with the leaching agent to remove at least a portion of the at least one interstitial constituent from the polycrystalline diamond table includes removing substantially all of the at least one interstitial constituent from the entire polycrystalline diamond table.

3. The method of claim 1, further comprising, after the act of leaching, bonding a substrate to the at least partially leached polycrystalline diamond table in a high-temperature/high-pressure process effective to at least partially infiltrate the at least partially leached polycrystalline diamond table with at least one infiltrant from the substrate to form a polycrystalline diamond compact.

4. The method of claim 3, further comprising, after the act of bonding, leaching the polycrystalline diamond compact to remove at least a portion of the at least one infiltrant from the polycrystalline diamond table of the polycrystalline diamond compact.

5. The method of claim 1, wherein the concentration of hydrofluoric acid is about 25 weight % to about 30 weight %, the concentration of nitric acid is about 10 weight % to about 15 weight %, and the concentration of water is about 55 weight % to about 65 weight %.

6. The method of claim 1, wherein the concentration of hydrofluoric acid is greater than about 15 weight % and the concentration of nitric acid is less than about 20 weight %.

7. The method of claim 6, wherein the mixture exhibits a viscosity of less than about 0.5 centipoise.

8. The method of claim 1, wherein the concentration of hydrofluoric acid is about 15 weight % to about 25 weight % and the concentration of nitric acid is about 10 weight % to about 20 weight %.

9. The method of claim 8, wherein the mixture exhibits a viscosity of less than about 0.4 centipoise.

10. A method of fabricating a polycrystalline diamond compact, the method comprising:
providing a polycrystalline diamond table including an interfacial surface bonded to a substrate and an opposing upper surface, wherein the polycrystalline diamond table includes a plurality of bonded diamond grains defining a plurality of interstitial regions at least a portion of which include at least one interstitial constituent disposed therein; and
leaching the polycrystalline diamond table with a leaching agent to remove at least a portion of the at least one interstitial constituent from the polycrystalline diamond table, wherein the leaching agent includes a mixture having a ratio of weight % hydrofluoric acid to weight % nitric acid of about 1.0 to about 2.4, and water in a concentration of about 50 weight % to about 85 weight %.

11. The method of claim 10, wherein the concentration of hydrofluoric acid is about 25 weight % to about 30 weight %, the concentration of nitric acid is about 10 weight % to about 15 weight %, and the concentration of water is about 55 weight % to about 65 weight %.

12. The method of claim 10, wherein the concentration of hydrofluoric acid is greater than about 15 weight % and the concentration of nitric acid is less than about 20 weight %.

13. The method of claim 12, wherein the mixture exhibits a viscosity of less than about 0.5 centipoise.

14. The method of claim 10, wherein the concentration of hydrofluoric acid is about 15 weight % to about 25 weight % and the concentration of nitric acid is about 10 weight % to about 20 weight %.

15. The method of claim 14, wherein the mixture exhibits a viscosity of less than about 0.4 centipoise.

16. The method of claim 10, wherein the mixture includes one or more additional constituents composed to reduce a viscosity of the mixture.

17. The method of claim 10, wherein leaching the polycrystalline diamond table with the leaching agent to remove at least a portion of the at least one interstitial constituent from the polycrystalline diamond table includes leaching the polycrystalline diamond table with the leaching agent at a temperature greater than about 75° C.

18. The method of claim 10, further comprising, prior to the act of leaching, positioning at least a portion of the polycrystalline diamond compact in a protective leaching cup.

19. The method of claim 18, wherein the protective leaching cup includes at least one of polyethylene, polypropylene, linear low density polyethylene, chlorosulfanted polyethylene, chlorinated polyethylene, polypropylene, fluoropolymer, perfluoroalkoxy, Kynar®, or Viton®.

20. A method of fabricating a polycrystalline diamond compact, the method comprising;
providing a polycrystalline diamond table including an interfacial surface bonded to a substrate and an opposing upper surface, wherein the polycrystalline diamond table includes a plurality of bonded diamond grains defining a plurality of interstitial regions at least a portion of which include at least one interstitial constituent disposed therein; and
leaching the polycrystalline diamond table with a leaching agent to remove at least a portion of the at least one interstitial constituent from the polycrystalline diamond table, wherein the leaching agent includes a mixture having a ratio of weight % hydrofluoric acid to weight % nitric acid of about 1.0 to about 2.4, the mixture exhibiting a viscosity of less than about 0.55 centipoise.

21. The method of claim 20, wherein the hydrofluoric acid is present in the mixture in a concentration that is greater than about 15 weight % and the nitric acid is present in the mixture in a concentration that is less than about 20 weight %.

22. The method of claim 20, wherein the hydrofluoric acid is present in the mixture in a concentration that is about 15 weight % to about 25 weight % and the nitric acid is present in the mixture in a concentration that is about 10 weight % to about 20 weight %.

23. The method of claim 22, wherein the viscosity is less than about 0.4 centipoise.

24. The method of claim 10, wherein leaching the polycrystalline diamond table with the leaching agent to remove at least a portion of the at least one interstitial constituent from the polycrystalline diamond table includes leaching the polycrystalline diamond table with the leaching agent for more than about 100 hours with the leaching agent at a temperature greater than about 25° C.

* * * * *